United States Patent [19]
Rebeaud

[11] Patent Number: 6,095,962
[45] Date of Patent: Aug. 1, 2000

[54] PLANAR MEMBER AND A CONTROL TABLE MOUNTING THE PLANAR MEMBER

[75] Inventor: Jean-Claude Rebeaud, Le Mont-sur-Lausanne, Switzerland

[73] Assignee: Bobst SA, Lausanne, Switzerland

[21] Appl. No.: 09/247,918

[22] Filed: Feb. 11, 1999

Related U.S. Application Data

[62] Division of application No. 08/632,387, Apr. 10, 1996, Pat. No. 5,893,825.

[30] Foreign Application Priority Data

Apr. 18, 1995 [CH] Switzerland .............................. 1104/95

[51] Int. Cl.$^7$ ................................ B31B 1/00; B31B 49/00
[52] U.S. Cl. ........................... 493/373; 493/468; 493/472
[58] Field of Search .............................. 225/93, 103, 104; 83/624, 662, 698.11, 698.71, 856; 493/342, 373, 468, 472; 269/239, 296

[56] References Cited

U.S. PATENT DOCUMENTS

| | | |
|---|---|---|
| 2,984,176 | 5/1961 | Sommer et al. . |
| 3,301,112 | 1/1967 | Peterson . |
| 3,929,059 | 12/1975 | Gendron .................................. 493/468 |
| 4,014,232 | 3/1977 | Mauger . |
| 4,175,686 | 11/1979 | Lang ....................................... 493/373 |
| 4,408,522 | 10/1983 | Yamane . |
| 4,541,828 | 9/1985 | Polic ....................................... 493/468 |
| 4,590,788 | 5/1986 | Wallis . |
| 5,049,122 | 9/1991 | Marschke ................................ 493/472 |
| 5,152,204 | 10/1992 | Trevizo . |
| 5,172,622 | 12/1992 | Sabin . |
| 5,529,565 | 6/1996 | Oetlinger ................................ 493/468 |
| 5,605,527 | 2/1997 | Gillieron . |
| 5,735,442 | 4/1998 | Emrich .................................... 493/373 |
| 5,810,233 | 9/1998 | Varidel .................................... 493/373 |

FOREIGN PATENT DOCUMENTS

| | | |
|---|---|---|
| 37 18 196 | 5/1989 | Germany . |
| 43 01 200 | 7/1994 | Germany . |
| 838420 | 6/1960 | United Kingdom . |
| 961801 | 6/1964 | United Kingdom . |
| 2 138 344 | 10/1984 | United Kingdom . |

*Primary Examiner*—Eugene L. Kim
*Attorney, Agent, or Firm*—Hill & Simpson

[57] ABSTRACT

The planar member for a stripping station for a machine for cutting sheet elements consists of a board which may be provided with openings if it is a stripping template, or if it is one of the upper or lower stripping boards is provided with working parts, on one surface and on an opposite surface is provided adjacent a downstream edge with a centering post and at least two mounting strips, an upstream edge of the member is provided with one or more mounting strips which strips protrude from the edges of the board and one of the sides of the board is provided with grasping handles. The planar member is mounted in a frame which has means for engaging the centering post and the mounting strips adjacent the downstream end so that the planar member is not subjected to warping. In addition, the planar member may be received in a table which has an arrangement for engaging the mounting strips to position the board so that a second stripping member such as the lower stripping member can be mounted above the planar member to enable positioning the stripping pins relative to the working parts of the planar member.

3 Claims, 4 Drawing Sheets

PLANAR MEMBER AND A CONTROL TABLE MOUNTING THE PLANAR MEMBER

CROSS REFERENCE TO THE RELATED APPLICATION

This application is a divisional of U.S. Ser. No. 08/632,387 filed Apr. 10, 1996, which issued as U.S. Pat. No. 5,893,825 on Apr. 13, 1999.

BACKGROUND OF THE INVENTION

The present invention is directed to a planar member as well as associated arrangements for mounting of the member in a machine for cutting sheet elements, such as for example sheets of paper or cardboard, or in an annexed control table. The invention concerns more particularly a member for supporting equipment for ejecting waste which member is installed in an ejection or stripping station, or a member having cutters which member is installed in a cutting platen press.

At present, machines are used to cut one or more box blanks into a sheet of material which blanks after folding and gluing, may be formed into boxes. Each blank has a format that generally includes six surfaces of a box with certain edges being provided with tongues or flaps for gluing and closing. Advantageously, the waste, which is the unused area of the sheet between the tongues or between the different blanks, is immediately ejected after cutting, so that in the output stack only sheets which contain finished blanks interconnected by break points are collected or accumulated.

A machine of this type usually comprises an input station in which the sheets are taken one by one from the top of a stack in order to be sent to a feed table where they are placed in position against front and lateral stops. The sheet can then be grasped at a front edge by a series of grippers or clamps mounted along a transverse bar whose ends are attached to lateral chain trains of a chain conveyor for leading the bar and any attached sheet into subsequent processing stations. The sheet is then conveyed into a cutting station comprising a platen press provided with cutters, which press is actuated during a dwell in the movement of the chain to cut the various blanks into the sheet. From the cutting station, the sheet is then conveyed to an ejection or stripping station where the waste material is grasped by pins in order to be moved downward into a container. If desired, the cutting station may be preceded by a printing station, also with platen. These processing stations are followed by a receiving or delivery station in which each cut sheet is released from the grippers or clamps so as to fall squarely onto the top of an output stack of die cut and stripped sheets.

In the ejecting or stripping station, the sheet is led flatly onto a first median means in the form of a horizontal board which is provided with apertures according to the periphery of the areas to be stripped from the die cut sheet. An upper horizontal stripping means, bearing stripping or ejecting pins, ejectors or pressers, is movable in the vertical direction according to an alternating motion, synchronized so that the ejecting or stripping means is lowered shortly after the arrival of a sheet. Under the aperture board is located a second horizontal ejecting or stripping means, called the lower means, which has vertical telescopic pins arranged in correspondence with the upper ejectors. Thus, when the upper stripping means lowers itself onto the cut sheet placed in position on the board, the respective combination of the ejector pins of the upper means and the telescopic pins grasp the waste areas and hold them as they move them downward, where they fall into the container.

In the following, the terms upstream and downstream are used in reference to the direction of displacement of the sheets, so that a piece on the upstream side is close to the entrance to the station, while a piece on the downstream side is close to the exit. Analogously, the expressions left and right are to be understood in relation to the running direction of the strip, with the left side usually being the driving side or the operator side and the right side being the side opposed to the driving side of the machine.

The ejecting or stripping means is changed for every change of production series in order to adapt the stripping means to new demands such as the type of sheet, the sheet format, and the various contours of the parts to be ejected or stripped from die cut sheet. In particular, the lower means must be designed so that its structure does not interfere with the free falling of the waste materials, once these have been removed from the die cut sheet.

To accomplish these goals, the upper and lower stripping means currently in use are each made up of immovable metallic rectangular interior frames to which a grid of crossbeams is attached. This frame and these crossbeams are made of formed metal bars, which are preferably made of aluminum, so as to be relatively light and save weight. The fact that these bars are shaped so as to be higher than they are wide ensures a great rigidity in the vertical direction of the stripping means. The ejecting or stripping means properly so called are then arranged along the crossbeams as needed and are held there by anchoring pieces.

The exterior surfaces of the upstream and downstream crossbeams of the frame of the stripping means comprise a groove that enables the means to be removed and then reinstalled in the station by passing through a lateral window or port and sliding it along the two upstream and downstream strips belonging to the drive mechanism of the stripping station. In addition, the frame is provided in its four corners with centering posts that have conical parts and that receive the locking tenons.

In order to facilitate the modification of these stripping means during changing from one production series to another, the stripping means are removed from the station and installed in a control table, i.e. a structure comprising pairs of support strips for the stripping means, arranged one above the other, and locking arrangements for the centering posts. In this table, the order of the stripping pins is inverted with the upper stripping means being installed in the lower part of the table, and the lower stripping means being installed in the upper part. This arrangement facilitates the precise positioning of the telescopic pins of the lower stripping means opposite the ejectors of the upper stripping means.

The handling of these ejecting or stripping means from the station to the control table and then back again is long and tiresome, due to the weight and cumbersomeness of these stripping means. Certain shops are equipped with lifting devices whose hook is specially adapted to lift an ejecting or stripping means and move it horizontally. Other shops have means for lifting the entire control table in order to lead it directly against the window or port of the station in order to slide the stripping means only. However, these operations are still very delicate.

Moreover, since the upper stripping means does not require intermediate space for the passage of the waste, the idea occurred to replace the grid of internal crossbeams with a single board in which are implanted the ejecting pins, ejectors and pressers. However, the holding of this board in the frame by means of a plurality of screws distributed on the periphery of the frame and supported against the edge of the board too frequently caused a warping of the board, which would distort the alignment of the pins. In addition, it was necessary to attach a rigid plate against an upper surface in order to hold the reaction forces to the pushing of the waste down and this caused the stripping board to remain too heavy and cumbersome.

SUMMARY OF THE INVENTION

The object of the present invention is to provide a planar member, in particular for an ejecting or stripping station of a machine for cutting sheet elements, which planar member is particularly easy to handle due to its weight and its reduced cumbersomeness. In addition, an object is to provide the mounting arrangements, in the station of the machine as well as a control table, which will ensure at all times a firm mounting and a precise positioning of the planar member, and which can be implemented easily and quickly.

To accomplish these aims, the planar member is a board which has a one surface provided with working parts such as openings or ejectors and/or pressers, and the opposite surface is provided at a downstream edge with a centering post and one or several mounting strips, and the upstream edge is provided with one or several mounting strips, which strips protrude from the external edges of the board. The board is provided along one side such as the left side with a grasping means. Thus, if the board is for the upper stripping means, the working parts are provided on the lower surface while the centering post and mounting strips are on the upper surface. If the board is for the lower stripping means or the stripping template, the upper surface is either free of any obstructions such as for a template, or is provided with the telescoping stripping pins while the lower surface is provided with the centering post and mounting strips.

This board is preferably made of wood, but may also be made of a synthetic material, in particular laminated, as long as it presents the same lightness at a similar degree of rigidity, and permits the implantation of processing means. This means, the board will have a dimension reduced to the strict minimum and being significantly lighter, so that the board can easily be handled by a single operator, especially since the grasping means, such as handles are provided by two simple openings, which are arranged along one side of the board opposite the window or entry port for the stripping station.

The arrangement for mounting this member in the station of the machine comprises a frame fixedly attached to this station, in which frame the lower surfaces of the upstream and downstream crossbeams are provided with support bars protruding into the interior of the frame in order to provide rails on which the mounting strips of the board rest, as well as the means for laterally pressing the centering post of the board against a stop of the frame and means for longitudinally pressing the downstream edge of the board against a vertical reference surface of the frame, e.g. the internal surface of the downstream support bar. Since the parts of the board are provided for the penetration of the sheet material, it is highly desirable that the frame comprise one or several intermediate reinforcing crossbeams whose lower edges are situated at the level of upper surface of the board while in the mounting arrangement.

In case of a board whose working parts are provided on the upper surface, it is thus advisable to replace the lower support bars with sliding rails provided on the upper surface of the upstream and downstream crossbeams. It is necessary that the frame may additionally comprise intermediate crossbeams whose upper surfaces are situated at the level of the lower surface of the board.

Accordingly, to a preferred embodiment, the means for longitudinal pressure on the downstream edge of the board comprises a transverse control shaft, mounted so as to be rotationally movable, close to and parallel to the internal surface of the downstream crossbeam of the frame. This shaft has a plurality of radial arms which will come to rest, directly or by the mediation of small bar connecting two arm ends, on the upstream surface of the downstream mounting strip at the end of the rotation of the shaft in one direction under the effect of compressed elastic means acting between the frame and the shaft or the arms, one end of the shaft will have a handle enabling the application of a rotation in a direction opposite the one direction.

It is thus advantageous that the means for applying a lateral pressure comprises a cam attached fixedly to the control shaft, the surface of this cam opposite the stop on the frame being fully or partially obliquely oriented, so as to push the centering post of the board laterally against the stop protruding from the internal surface of the downstream crossbeam of the frame during rotation of the shaft under the effect of the elastic means.

Advantageously, the elastic means comprises one or several helicoidal springs coaxially received on the control shaft, to which they are attached at one end, for example by a mounting bracket, and of which the other end is attached to the body of a support bearings of the shaft which bearings are attached fixedly to the frame. The advantage of the arrangement is that it effects a gripping action only on the downstream edge of the board, the upstream edge resting freely on its corresponding support bars. This arrangement avoids all risk of harmful warping. In addition, the gripping action may be rendered uniform by the use of several springs and support arms or small support bars. Finally, by simply raising the handle, it is possible to release the board from its frame quickly and completely. Conversely, longitudinal and lateral locking takes place simultaneously when the handle is lowered.

In the case of an upper ejecting or stripping means according to the invention, the mounting arrangement of this board member is placed upside down in a control table which comprises a pair of support bars mounted horizontally opposite one another in this framework of the table. By means of braces if necessary, the first support bar receives the downstream strip having a centering notch for the centering post of the planar board member, this bar being additionally topped by a reference bar against which the downstream edge of the board comes to rest. The second support bar that receives the upstream strip being provided with elastic means driving the planar member into the direction of the first support bar.

According to a preferred embodiment, the elastic means comprises a vertical spring blade extending parallel to the second support bar, whose upper edge is fixedly attached to the framework of the table and whose lower edge engages on an exterior edge of the upstream strip.

The installation of the board means in the control table is particularly rapid and always precise. This table may be made lighter inasmuch as no movement of its functioning requires a gripping holding means.

Other advantages and features of the invention will be readily apparent from the following description of the preferred embodiments, the claims and drawings.

DESCRIPTION OF THE PREFERRED EMBODIMENTS

Figure 1:
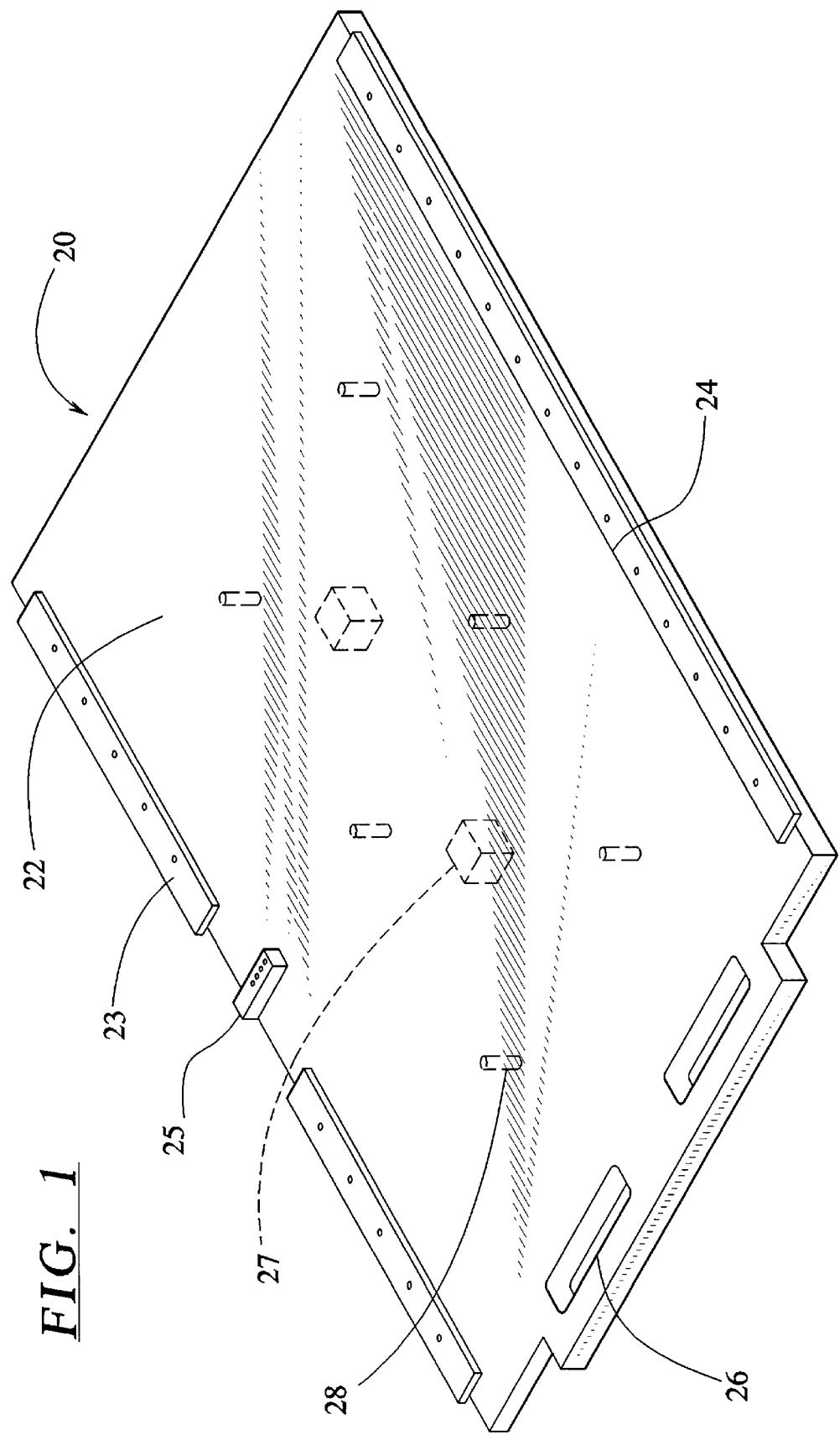
FIG. 1 is a perspective view of a planar member in accordance with the present invention.

The principals of the present invention are particular useful when incorporated in a planar member generally indicated at 20 which is used as an upper stripping or ejection member or means. The member comprises a board 22, in whose lower surfaces are implanted upper ejection or stripping pins or ejectors 28, as well as pressure blocks 27 that will flatten the sheet of paper or cardboard against the intermediate aperture board. The upper surface of the board 22 is provided on its upstream edge with a single strip 24 and on its downstream edge with a two half-strips 23 surrounding a centering ring post or strip 25, which is situated on the median line of the board. The strips 23 and 24 are in the form of elongated metal plates having a rectangular cross-section and are held on by screws along the edge of the board in such a manner that a part lying between a quarter and a third of the breadth or width of the strip will protrude from the outer edge of the board 22 by an amount of 6 to 8 mm.

The left edge of the member 20, which edge faces the operator or driving side of the machine, is provided with handles 26 which are illustrated in a simple form of two rectangular openings. The board 22 is preferably made of wood, a material that is inexpensive, easy to work and relatively light. It may be in the form of a laminated wood board, or of course, the board can also be made of plastic material and/or laminated resin. The board measures 755 mm by 556 mm. Thus, the board of this sort can be easily transported by a single operator.

To hold the board 22 in a stripping station, a frame 30 is permanently installed in the stripping station and specially modified to receive the upper stripping planar member of FIG. 1. This frame 30 is formed from two crossbeams: one being an upstream beam 32 and the other a downstream beam 34, which are held together by two side members, including a right side member 35 and a left side member 36. In a known fashion, the exterior surface of the upstream and downstream crossbeams are provided with a groove such as 33, enabling the frame to engage the strips belonging to the station's drive mechanism so that the frame can be reciprocated in the stripping station. The precision of the position of this frame in the station is ensured by four posts 37 attached to the four corners of the frame, and these posts having a conical centering part and a central orifice that receives a locking tenon.

Figure 3:
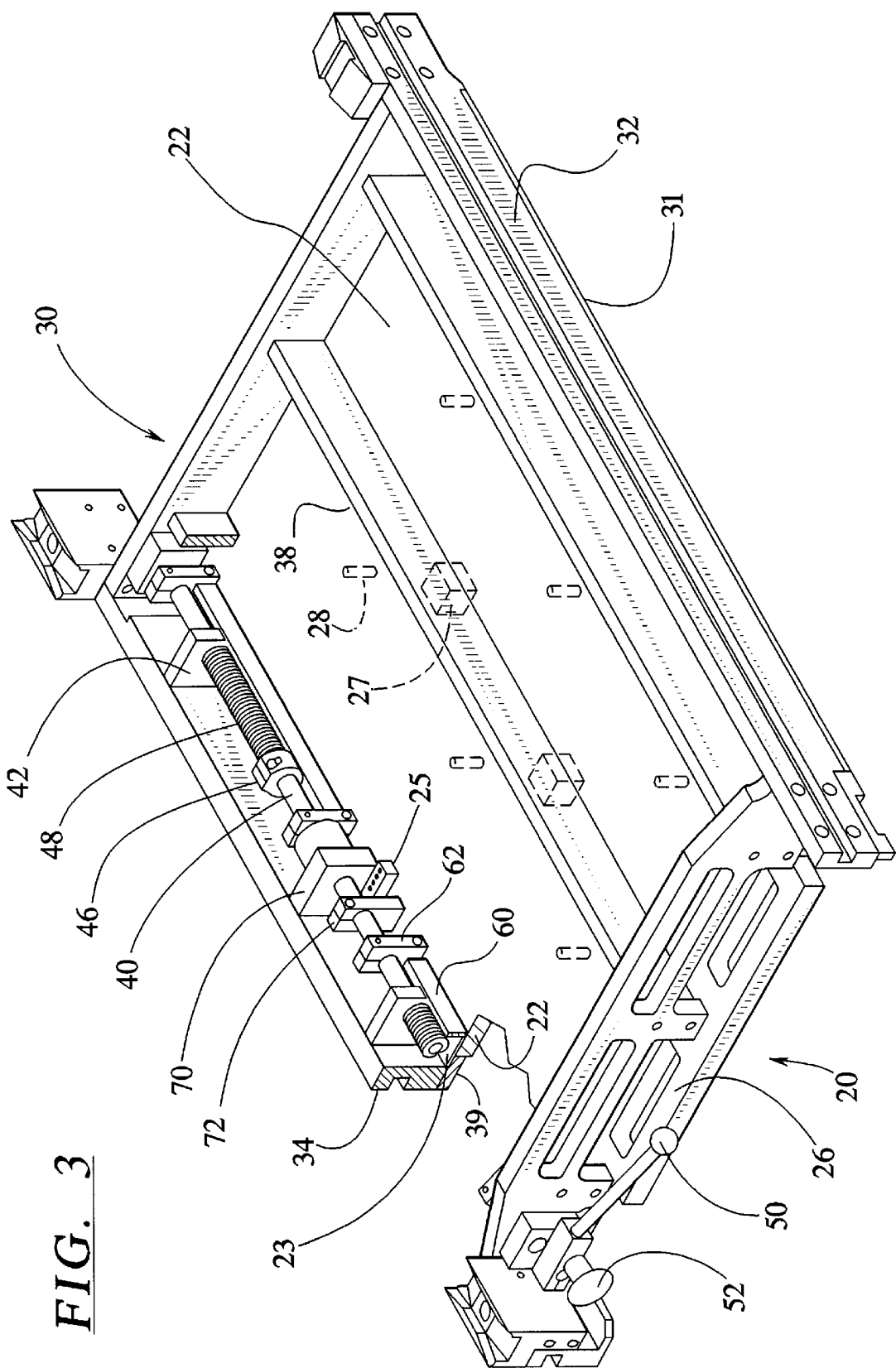
FIG. 3 is a perspective view of the mounting arrangement of FIG. 2, with the planar member installed therein.

More particularly, according to the present invention, the lower edge of the upstream crossbeam 32 and the lower edge of the downstream crossbeam 34 are respectively provided with an upstream support bar 31 and a downstream support bar 39, (best illustrated in FIG. 3). These elongated support bars, have a transverse rectangular cross-section and are mounted so as to protrude into the interior of the frame at a distance comprising a fourth or even a third of their breadth, so that each bar forms a rail with a width of about 10 mm.

In addition, the frame 30 is provided with intermediate crossbeams 38, that extend parallel to the upstream and downstream crossbeams. The lower surface of these intermediate crossbeams are in addition at the same level as the lower surfaces of the upstream and downstream crossbeams, i.e. with the upper surfaces of the support bars 31, 39. All of these crossbeams present a transverse section whose height is greater than its breadth, so as to ensure a good vertical rigidity.

The frame 30 additionally includes, on the interior surface of the downstream crossbeam 34, an arrangement for placing into position and rapidly locking of the downstream edge of the planar member 20. This arrangement is illustrated in the open position in FIG. 2 and in the closed position or locking position in FIG. 3.

The arrangement comprises, first, a control shaft 40 which is held in a rotationally mobile way by two end bearings and several intermediate bearings 42. If desired, this shaft may be composed of several sections connected by one or several sleeve tubes 44.

The control shaft has two pairs of radial arms 62, and each pair has a small support bar 60 extending between the two arms of the pair. The size of the arms is calculated so that in the vertical position oriented downward, the lower edge of the small bars 60 lies slightly above (on the order of 2 to 5 mm) the level of the lower surfaces of the crossbeams.

Each control shaft also has a lateral locking cam 72 which is positioned near a center stop 70 of the frame, and which stop forms a complementary bearing for the shaft 40. In considering this cam oriented vertically downward, as shown in FIG. 3, it is to be noted that the downstream edge of the active surface, i.e. facing the stop 70, is chamfered to a width 74, and this oblique part being oriented toward the crossbeam 34. If desired, only the lower half of this edge is chamfered. Alternatively, the lower half of the active surface of the cam is obliquely oriented downward, though this arrangement is slightly less effective.

Two cylindrical helicoidal springs 48, acting angularly, are threaded onto the control shaft 40. More precisely, one end of the spring, e.g. the right end, is engaged in an orifice or opening in the bearing so as to be anchored to the frame, while the other (left) end is fixedly attached to the control shaft 40 by a locking collar 46. This spring 48 is compressed in rotation so that at rest it tends to turn the shaft 40 in the clockwise direction, as shown in FIGS. 2 and 3, i.e. it tends to turn the small bar 60 and the cam 72 downward.

The left end of the shaft 40, i.e. on the driving side, has a handle 50 enabling the shaft to be turned in the counter-clockwise direction, against the force of the springs 48, and to hold it in position by means of a handle latch 52 that will penetrate into a corresponding orifice or opening of the frame. Thus, when the handle is in the up position as shown in FIG. 2, the small bars 60 and the cam 72 are in the raised or retracted position.

Figure 2:
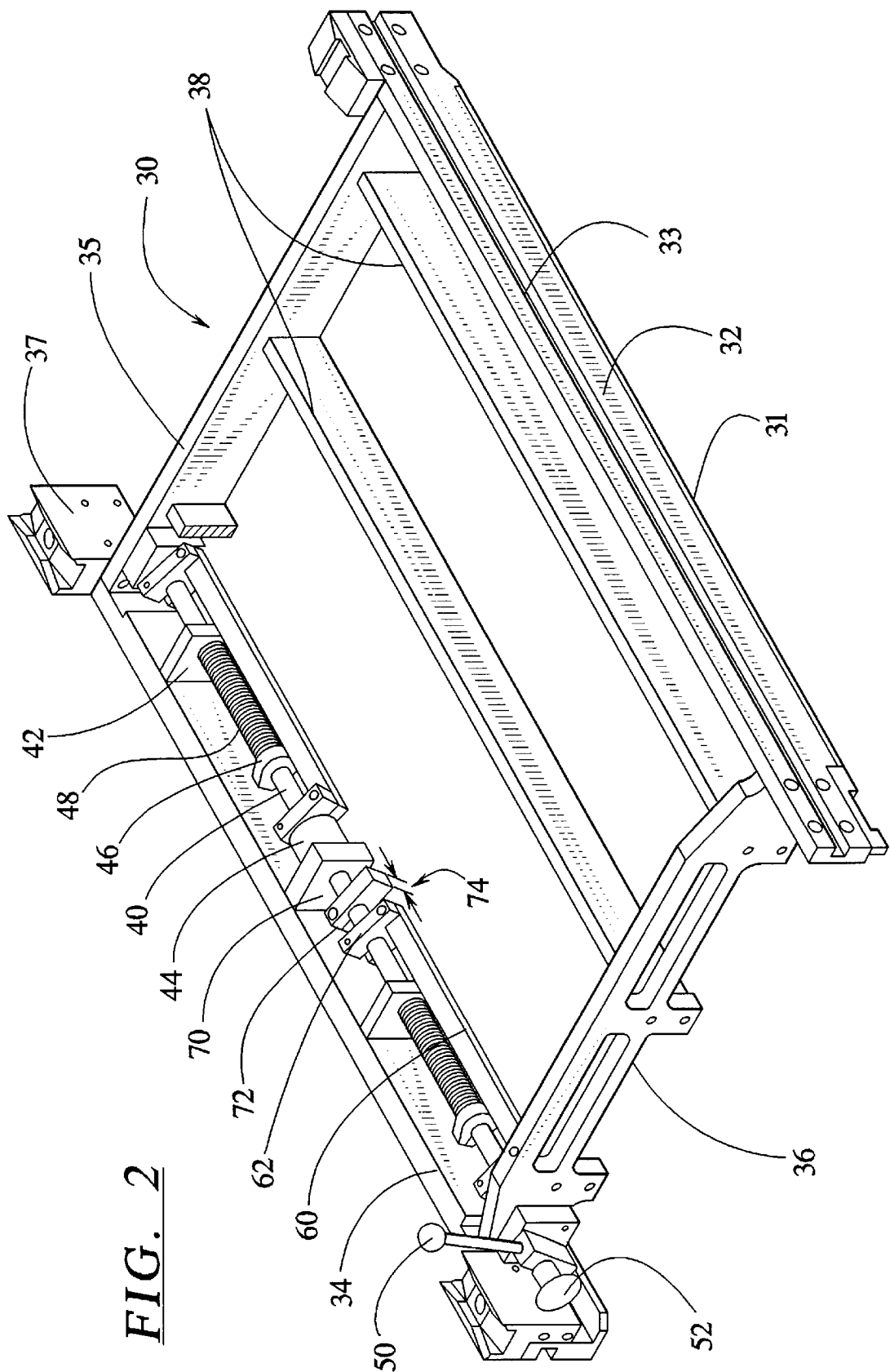
FIG. 2 is a perspective view of an arrangement for mounting the planar member of FIG. 1 in a machine.

In the raised or retracted position illustrated in FIG. 2, it is possible to insert the planar member 20 illustrated in FIG. 1 into the upper ejecting frame 30 by sliding the upstream strip 24 along the upstream support bar 31 and the downstream strips 23 along the corresponding support bar 39. The upper surface of the member 20 is then level with the lower surfaces of each of the crossbeams. This translation takes place until the centering post 25 becomes wedged against the stop 70.

When the handle 50 is subsequently lowered, as shown in FIG. 3, the small bars 60 come to rest against the upstream edge surface of the downstream strips 23, and, simultaneously, the right active surface of the cam 72 comes to rest against the left surface of the centering post 25. The main effect of this is to push the downstream edge of the board 22 against the upstream edge of the downstream support bar 39, the position of this edge of the support bar being controlled as a reference line, called a first contact line. These support bars exert a considerable force on these strips, which force is on the order of 50 newtons. The second effect is that the oblique part of the active surface of the cam 72 has progressively pressed the centering post against the stop 70, and subsequently holds it firmly. It can be seen that this placing of the member 20 into position in the frame 30 is particularly rapid. Above all, the holding forces being essentially exerted on the downstream part, the upstream strip 24 will rest naturally on a support bar 31 and the right and left edges of the planar member 20 remain free. Thus, no tension is placed in the plane of the planar member, so that any risk of warping is avoided.

Figure 4:
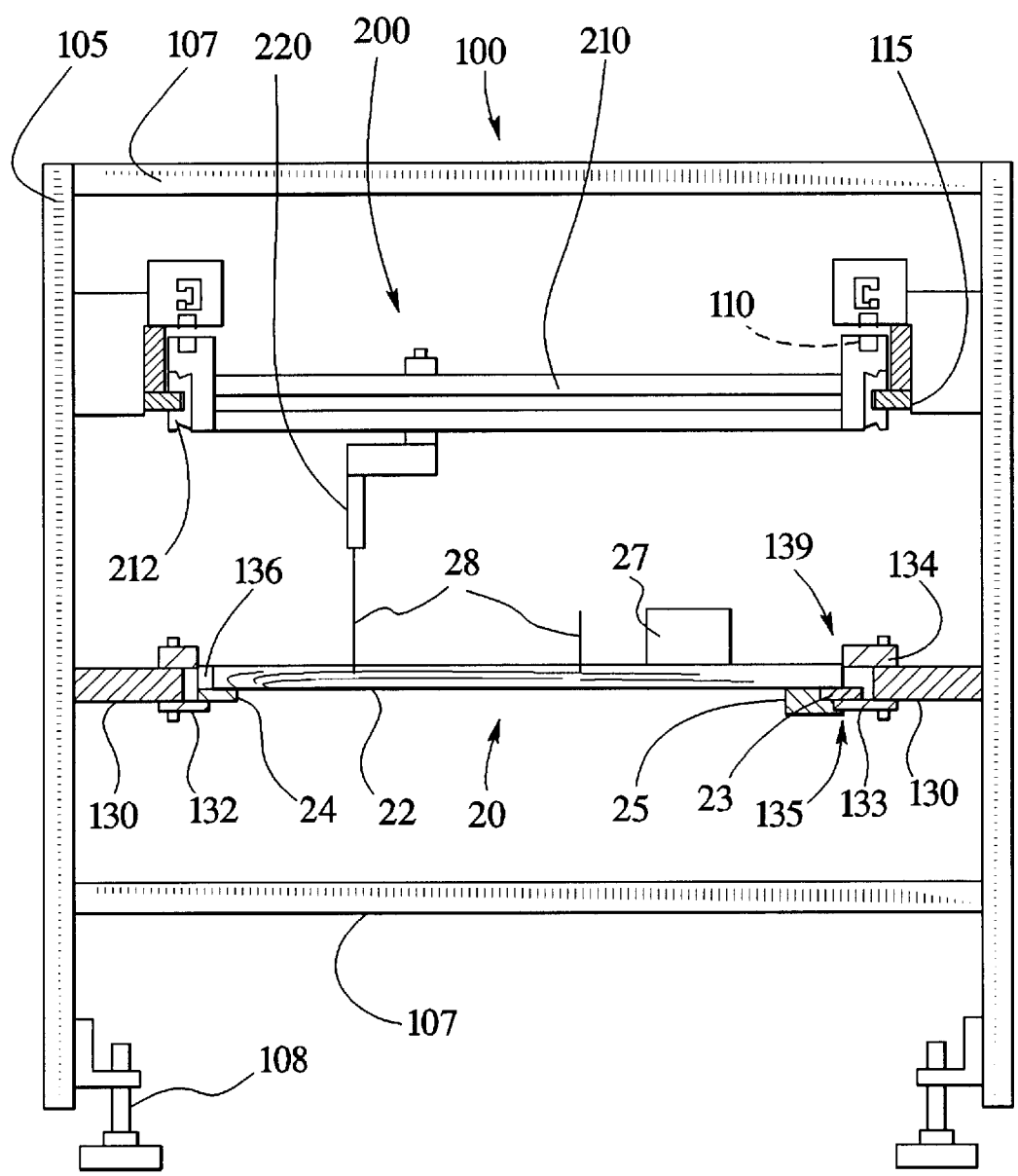
FIG. 4 is a side view of a control table containing a lower stripping member, and an upper stripping member, which members are constructed in accordance with the present invention.

In order to position the various telescopic pins relative to the stripper pins in the upper stripping member 20, a control table 100 of FIG. 4 is used. The control table 100 comprises two longitudinal mounting plates or sides 105, connected among themselves by upper and lower crossbeams 107. The mounting plates 105 are installed on feet 108. As illustrated, the stripping means or members which are in the frame of FIG. 4 are mounted upside down, i.e. with the upper ejecting or stripping member 20 being situated in the lower part of the control table 100 with its working parts oriented upward, while the lower ejecting or stripping means 200 is situated in the upper part of the table with the telescopic pins 220 oriented downward.

In a conventional manner, a frame 210 of the lower stripping means presents upstream and downstream grooves 212 which enable this means to engage with the horizontal support strip 115, fixed along the mounting plate 105 by braces 140. The frame 210 is fixed in position by locking tenons 110, which can be moved by rods crossing a C-shaped recess, and these tenons penetrate into mounting posts similar to the post 37 illustrated in FIG. 2.

More particularly, according to the invention the control table comprises two horizontal support bars, an upstream bar 132 and a downstream bar 133, which are fixed along the mounting plates 105 by braces 130. The first support bar 133 is additionally provided with a bar 134, whose left edge defines a first contact line or reference edge 139. On the other side, the second support bar 132 is provided with a vertical spring blade 136 whose upper edge is fixed to a complementary bar 141 so that the lower edge is flexible.

An upper ejecting or stripping member 20 may thus easily be placed into position by sliding the downstream strip 23 along the first support bar 133 and the upstream strip 24 along the second support bar 132. For an initial time period, the board is offset to the left against the action of the spring blade 136 until the centering post falls into a corresponding recess 135.

With the planar member 20 in the aligned position in the table 100 and the lower stripping member 200 in the position, telescoping pins such as 220 can be positioned and aligned with the stripping pins 28 of the upper member 20.

The mounting arrangement illustrated in FIGS. 2 and 3 may also be used for an intermediate ejecting member or means which is an aperture board or template on which the cut sheet comes to rest. It would also be possible to use the same arrangement in the cutting station as an upper plate bearing a board whose lower surface is provided with cutting blades and creasing rules. Thus, the upper ejecting stripping member, the ported board or template and the cutting means may be easily manufactured in the operator's shop. The control table can then be used only for controlling the lower frame bearing the telescopic pins, outside of the machine. The handling of the preparation for different production series is thus made considerably easier. The control table will thus henceforth include only a single frame, which is that of the lower ejection frame 200.

Although various minor modifications may be suggested by those versed in the art, it should be understood that I wish to embody within the scope of the patent granted hereon all such modifications as reasonably and properly come within the scope of my contribution to the art.

I claim:

1. A planar member for a machine for cutting sheet elements, said member being a rectangular board member having an upstream edge and a downstream edge extending between two sides, said board member having an upper planar surface and a lower planar surface, one surface of said upper and lower planar surfaces having a centering post being mounted adjacent the downstream edge on a centered meridian of said member, at least one mounting strip being positioned on each side of said centering post along the downstream edge and a mounting strip being arranged on said one surface along the upstream edge, each of said mounting strips extending beyond the adjacent edge to form a ledge along the upstream edge and the downstream edge to form mounting ledges.

2. A planar member according to claim 1, wherein said board member has apertures.

3. A planar member according to claim 1, wherein said member is an ejection member for a stripping station and has equipment for ejecting waste being mounted on the other surface of the upper and lower planar surfaces.

* * * * *